US008155846B2

(12) United States Patent
Serra et al.

(10) Patent No.: US 8,155,846 B2
(45) Date of Patent: Apr. 10, 2012

(54) POWER TRAIN CONTROL METHOD AND SYSTEM

(75) Inventors: Gabriele Serra, S. Lazzaro di Savena (IT); Matteo De Cesare, Torremaggiore (IT); Fabrizio Ponti, Forli' (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 348 days.

(21) Appl. No.: 11/732,907

(22) Filed: Apr. 4, 2007

(65) Prior Publication Data

US 2007/0294015 A1 Dec. 20, 2007

(30) Foreign Application Priority Data

Apr. 6, 2006 (EP) .................................... 06425240

(51) Int. Cl.

| | |
|---|---|
| ***G06F 19/00*** | (2011.01) |
| ***G01L 23/22*** | (2006.01) |
| ***G01M 15/00*** | (2006.01) |
| ***B60W 10/00*** | (2006.01) |
| ***F16H 59/74*** | (2006.01) |

(52) U.S. Cl. .... 701/54; 701/111; 73/114.07; 73/114.33; 477/95; 477/104

(58) Field of Classification Search ................ 701/1, 29, 701/36, 70, 79, 84–86, 99, 53–56, 101, 110–111, 701/115; 333/193–196; 310/313 R; 181/139
See application file for complete search history.

(56) References Cited

U.S. PATENT DOCUMENTS

| | | | | |
|---|---|---|---|---|
| 4,750,103 | A * | 6/1988 | Abo et al. | 701/111 |
| 5,315,954 | A * | 5/1994 | Richmond | 116/67 R |
| 5,485,380 | A * | 1/1996 | Takasuka et al. | 701/29 |
| 5,642,445 | A * | 6/1997 | Bucaro et al. | 385/12 |
| 5,935,189 | A * | 8/1999 | Park | 701/111 |
| 6,494,184 | B2 | 12/2002 | Nawa et al. | |
| 6,494,186 | B1 * | 12/2002 | Wakeman | 123/479 |
| 6,546,328 | B1 * | 4/2003 | Slicker | 701/111 |
| 6,650,994 | B2 | 11/2003 | Muhlberger et al. | |
| 6,845,312 | B1 * | 1/2005 | Cross et al. | 701/111 |
| 7,155,333 | B1 * | 12/2006 | Abram et al. | 701/111 |
| 2004/0015282 | A1 * | 1/2004 | Babala et al. | 701/70 |
| 2004/0220719 | A1 * | 11/2004 | Sgatti et al. | 701/111 |
| 2006/0085119 | A1 * | 4/2006 | Damitz et al. | 701/111 |

FOREIGN PATENT DOCUMENTS

| | | | |
|---|---|---|---|
| DE | 100 32 932 A1 | | 2/2002 |
| DE | 10032931 | * | 2/2002 |
| WO | WO 01/023731 | | 4/2001 |

* cited by examiner

*Primary Examiner* — James Trammell
*Assistant Examiner* — Muhammad Shafi
(74) *Attorney, Agent, or Firm* — Mitchell P. Brook; Luce, Forward, Hamilton & Scripps LLP

(57) ABSTRACT

A method and system for controlling an internal combustion power train, whereby the values of various operating parameters of the power train are measured by means of a number of sensors, and operation of the engine is monitored by means of at least one control unit, which is physically separate from the engine block and connected to the sensors; at least one pressure sensor is housed in the control unit, is physically separate from the engine block, and determines the intensity of pressure waves generated by the power train; and the control unit determines the value of at least one operating parameter of the power train as a function of the intensity of the pressure waves generated by the power train.

3 Claims, 3 Drawing Sheets

POWER TRAIN CONTROL METHOD AND SYSTEM

The present invention relates to a power train control method and system.

The present invention may be used to advantage in a power train comprising an internal combustion engine, to which the following description refers purely by way of example.

BACKGROUND OF THE INVENTION

The control system of a power train comprising an internal combustion engine comprises at least one electronic control unit (ECU) located close to the engine and normally housed in the engine compartment of a vehicle; and a number of sensors connected to the control unit to measure various power train operating parameters (e.g. drive shaft angular position and rotation speed) which are used by the control unit to control the power train.

Optimum control of power train performance by the control system calls for measuring various power train parameters which are extremely complicated and expensive to measure (such as the rotation speed of a turbosupercharger). In other words, certain power train parameters (such as turbosupercharger rotation speed) can only be measured accurately using either laboratory instruments (which are extremely accurate but obviously unfeasible in a mass production context, for reasons of cost, size, and dependability) or invasive, extremely high-cost, potentially unreliable sensors.

US 20010023685 A1 discloses an air-fuel mixture control device controlling a combustible air-fuel mixture to be supplied to a combustion chamber of an engine; this device is constructed of an injector used for fuel supply, a fuel pump, a fuel filter, a fuel pressure regulator, and an electronic control unit, which are united as an assembly with respect to a throttle body including an intake passage and a throttle valve. A memory incorporated in the ECU stores a correction value with respect to the fuel injection quantity dispersion preliminarily experimentally determined on an assembly-by-assembly basis; the ECU corrects the fuel injection quantity based on the correction value stored in the memory to control the fuel injection quantity.

SUMMARY OF THE INVENTION

It is an object of the present invention to provide a power train control method and system designed to eliminate the aforementioned drawbacks, and which are straightforward and cheap to implement.

According to the present invention, there are provided a power train control method and system as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
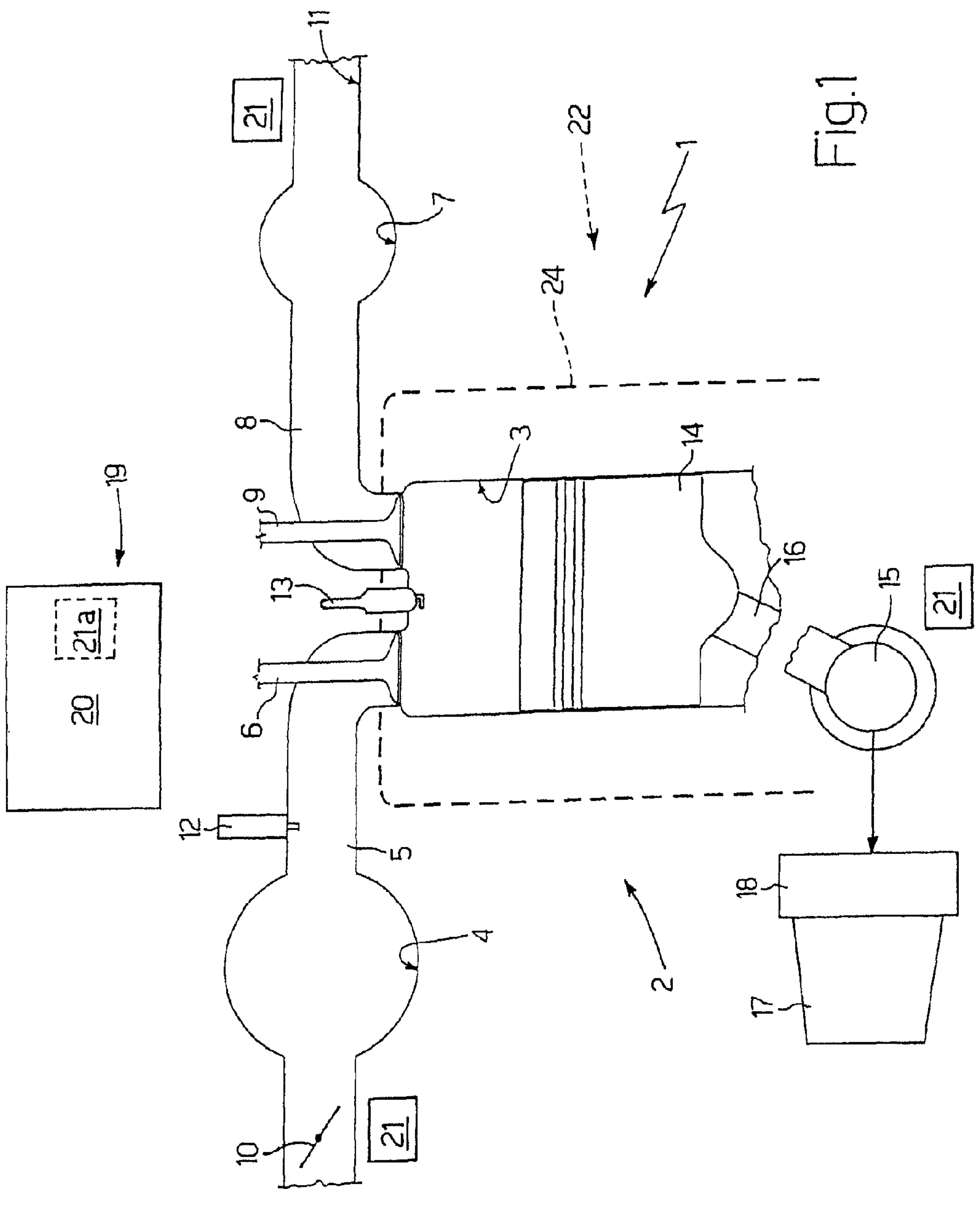
FIG. 1 shows a schematic view of a power train featuring a control system in accordance with the present invention.

Number 1 in FIG. 1 indicates as a whole a power train for a road vehicle (not shown).

Power train 1 comprises an internal combustion engine 2 with four cylinders 3 (only one shown in FIG. 1), each of which is connected to an intake manifold 4 by an intake pipe 5 regulated by at least one intake valve 6, and is connected to an exhaust manifold 7 by an exhaust pipe 8 regulated by at least one exhaust valve 9.

Intake manifold 4 is supplied with fresh air (i.e. air from outside) via a throttle valve 10 adjustable between a closed position and a fully-open position. An exhaust device 11 with one or more catalysts (not shown in detail) extends from exhaust manifold 7 to expel the gases produced by combustion inside cylinders 3 into the atmosphere. A turbosupercharger (not shown) may be provided downstream from exhaust manifold 7 and upstream from intake manifold 4, to exploit the kinetic energy of the exhaust gas to increase the speed and pressure of the fresh air intake through intake manifold 4.

Four injectors 12 (one for each cylinder 3) are fitted to intake pipes 5 to inject petrol cyclically into intake pipes 5; and four spark plugs 13 (one for each cylinder 3) are fitted to cylinders 3 to cyclically ignite the mixture inside cylinders 3.

Each cylinder 3 has a piston 14, which slides linearly along cylinder 3 and is connected mechanically by a connecting rod 16 to a drive shaft 15, in turn connected mechanically to a transmission 17 with the interposition of a clutch 18 to transmit drive torque to the drive wheels of the vehicle (not shown).

Power train 1 comprises a control system 19 for monitoring operation of power train 1. Control system 19 comprises at least one electronic control unit 20 (ECU) which monitors operation of power train 1, is located close to engine 2, and is normally housed inside the engine compartment of the vehicle (not shown); and a number of sensors 21 connected to control unit 20 to measure various operating parameters of power train 1 (e.g. the angular position and rotation speed of drive shaft 15) which are used by control unit 20 to control power train 1.

Figure 2:
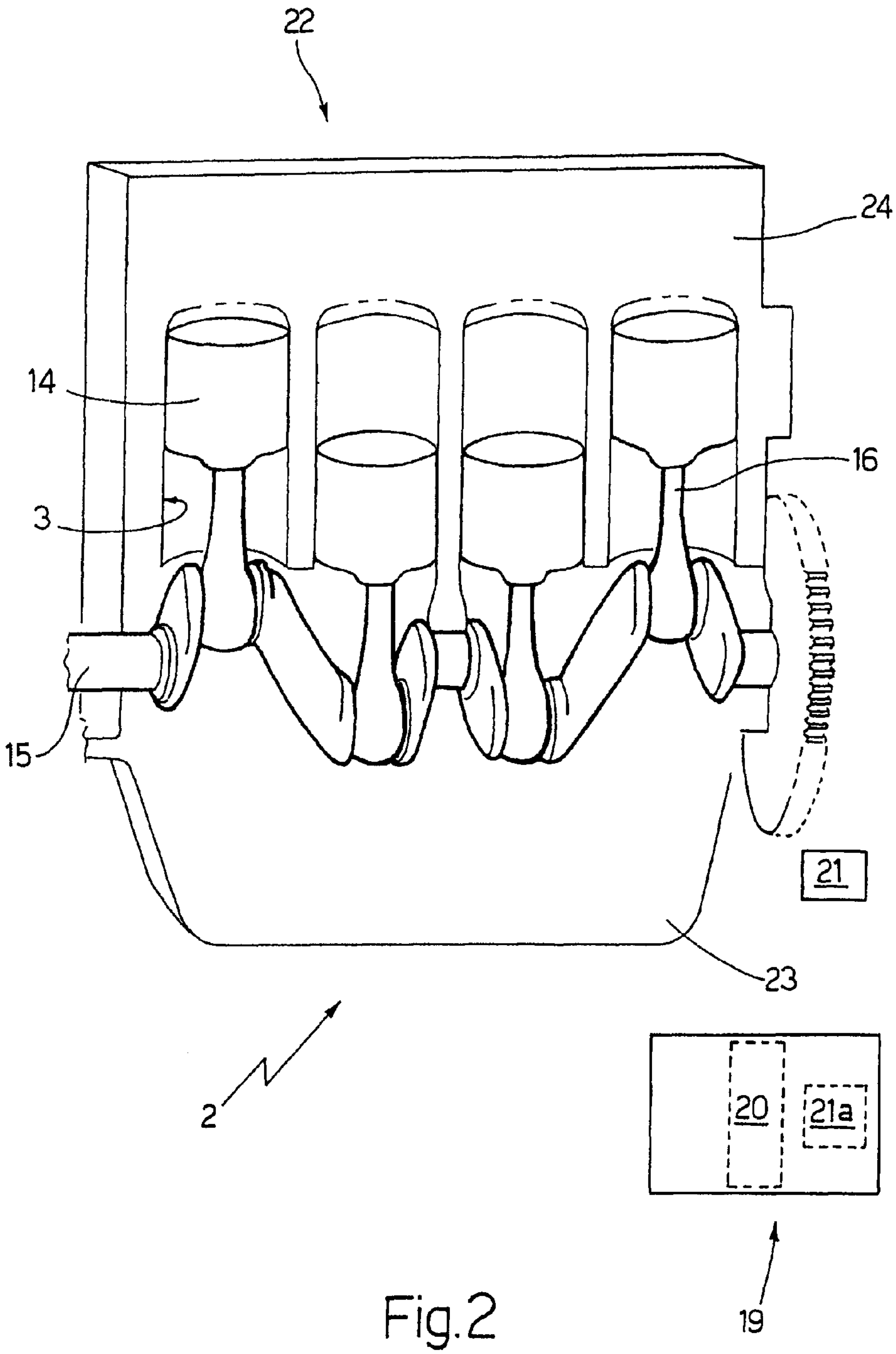
FIG. 2 shows a schematic view in perspective, with parts removed for clarity, of an internal combustion engine of the FIG. 1 power train.

As shown in FIG. 2, engine 2 comprises an engine block 22 containing the rotary members and comprising a crankcase 23 and a cylinder head 23 in which the four cylinders 3 are formed. It should be pointed out that control unit 20 is housed inside the engine compartment, close to engine block 22, and is therefore physically separate from engine block 22.

As shown in FIGS. 1 and 2, at least one acoustic pressure sensor **21*a* is housed in control unit 20 (and therefore physically separate from engine block 22) to determine the intensity of pressure waves generated by power train 1, and as a function of which control unit 20 determines the value of at least one operating parameter of power train 1. More specifically, as a function of the intensity of the pressure waves generated by power train 1, control unit 20 determines the speed of rotary members of power train 1 (e.g. turbosupercharger, drive shaft 15, camshaft, and primary and secondary shaft of transmission 17) as well as combustion phenomena (e.g. detonation phenomena) inside cylinders 3 of engine 2**.

Figure 3:
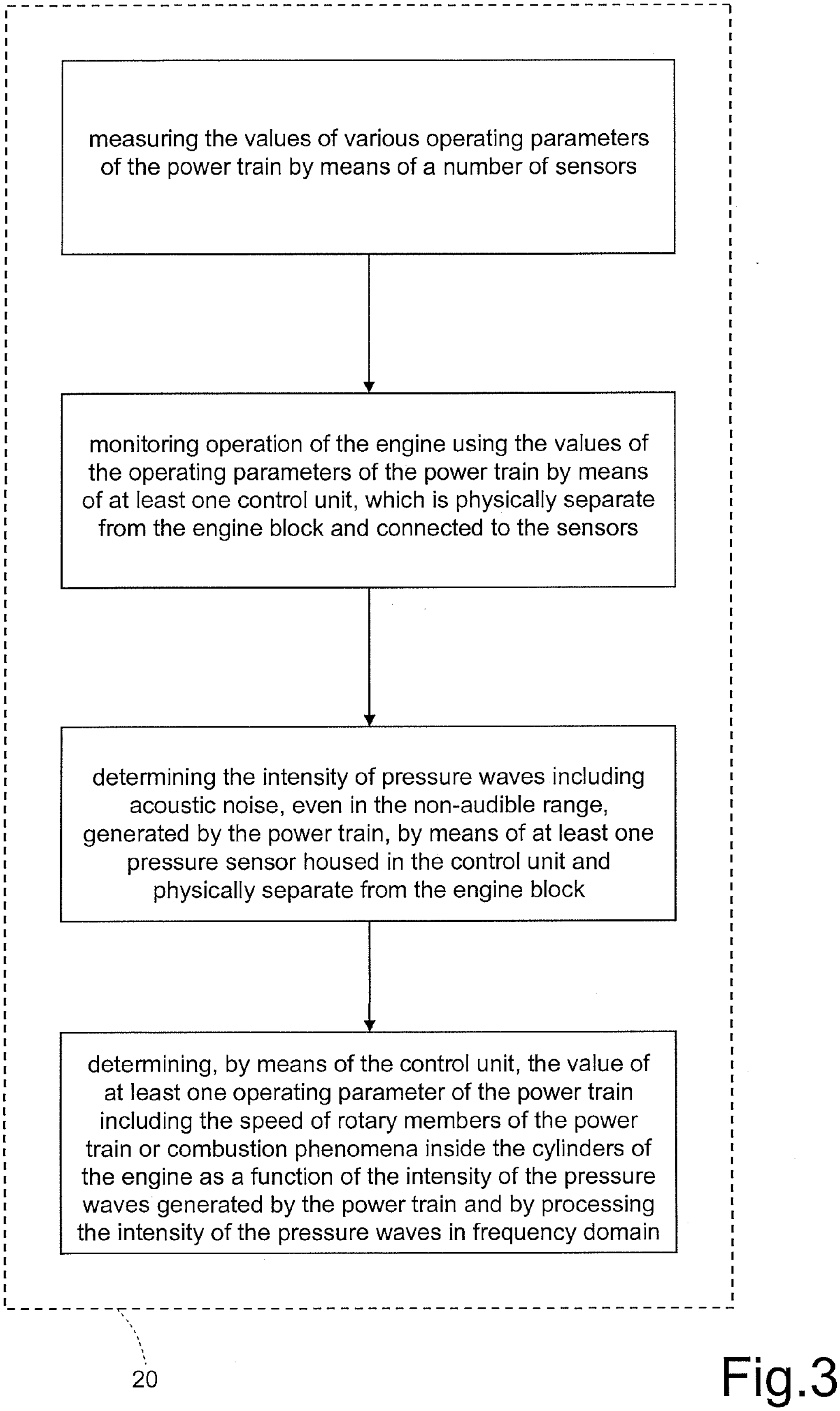
FIG. 3 shows a process flow chart of the step of processing the intensity of the pressure waves in frequency in accordance with the present invention.

As shown in FIG. 3, processing the intensity of the pressure waves generated by power train 1 to determine the value of at least one operating parameter of power train 1 comprises processing the intensity of the pressure waves in frequency, and may comprise combining the intensity of the pressure waves with signals (e.g. temperature, vibration, or instantaneous speed signals) from other sensors 21.

In other words, at least one pressure sensor 21*a* is incorporated in control unit 20, and therefore outside engine block 22, to gather physical evidence concerning the operation of power train 1, with no direct connection (piping or contact) to engine block 22, but by gathering pressure waves (and therefore also acoustic noise, even in the non-audible range). The purpose of pressure sensor 21*a* is to extract operating quantities representing phenomena occurring in engine 2 or transmission 17, e.g. turbosupercharger rotation speed, the rotation speed of drive shaft 15, the rotation speed of a secondary shaft of transmission 17 (from which the engaged gear can be determined), and combustion status (e.g. detonation phenomena).

Sensor 21*a* is cheap and easy to use, by being installable with no difficulty whatsoever inside control unit 20. In this connection, it should be pointed out that, being separate from engine block 22, control unit 20 is subject to no mechanical or thermal stress, and need not be any particular shape or size (so that space can easily be found for sensor 21*a*). Moreover, control unit 20 being subject to no mechanical or thermal stress, sensor 21*a* incorporated in control unit 20 may be simple in design yet highly reliable.

The invention claimed is:

1. A control method for controlling an internal combustion power train comprising an engine having an engine block containing rotary members and comprising a crankcase, and a cylinder head in which a number of cylinders are formed; the control method comprising the steps of:

determining the intensity of acoustic noise even in the non-audible range generated by the power train, the determining step performed using an acoustic sensor housed in a control unit, the acoustic sensor and the control unit being physically separate from and not in contact with the engine block so that the acoustic sensor receives the acoustic noise as pressure waves propagating through the air that surrounds the engine block, and the determining step including the acoustic sensor providing data output to the control unit, the data output indicating an intensity of the acoustic noise;

receiving the data output including the intensity of the acoustic noise from the acoustic sensor;

the control unit processing the data corresponding to the intensity of the acoustic noise in frequency domain to extract operating quantities representing phenomena occurring in the powertrain; and controlling operation of the engine using the data output by means of the control unit, which is physically separate from the engine block and houses the acoustic sensor.

2. A control method as claimed in claim 1, wherein processing the intensity of the acoustic noise generated by the power train comprises combining the intensity of the acoustic noise with signals from other sensors.

3. A control system for controlling an internal combustion power train comprising an engine having an engine block containing rotary members and comprising a crankcase, and a cylinder head in which a number of cylinders are formed, the control system comprising:

a control unit physically separate from the engine block and which monitors operation of the engine; and an acoustic sensor which is housed in the control unit, determines the intensity of acoustic noise even in the non-audible range generated by the power train, and is physically separate from and not in contact with the engine block so that the acoustic sensor receives the acoustic noise as pressure waves propagating through the air that surrounds the engine block, and provides data output including the intensity of acoustic noise to the control unit;

wherein the control unit receives the data output including the intensity of the acoustic noise from the acoustic sensor and processes the intensity of the acoustic noise in frequency domain to extract operating quantities representing phenomena occurring in the power train; and wherein the control unit controls operation of the engine using the data output from the at least one acoustic sensor.

* * * * *